United States Patent
Iwata

(10) Patent No.: US 9,677,941 B2
(45) Date of Patent: Jun. 13, 2017

(54) OBJECT MOVEMENT CONTROL DEVICE AND FOURIER TRANSFORM INFRARED SPECTROPHOTOMETER

(71) Applicant: SHIMADZU CORPORATION, Kyoto-shi, Kyoto (JP)

(72) Inventor: Akihiko Iwata, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 14/491,336

(22) Filed: Sep. 19, 2014

(65) Prior Publication Data
US 2016/0084711 A1  Mar. 24, 2016

(51) Int. Cl.
G01B 9/02 (2006.01)
G01J 3/453 (2006.01)
G01J 3/10 (2006.01)
G01J 3/02 (2006.01)

(52) U.S. Cl.
CPC ............ *G01J 3/4535* (2013.01); *G01J 3/021* (2013.01); *G01J 3/0202* (2013.01); *G01J 3/027* (2013.01); *G01J 3/0208* (2013.01); *G01J 3/0264* (2013.01); *G01J 3/0278* (2013.01); *G01J 3/108* (2013.01)

(58) Field of Classification Search
CPC ..... G01J 3/4535; G01J 3/108; G01B 9/02011; G01B 9/02065; G01B 9/02067; G01B 9/0207; G01B 9/02072; G01B 9/02076; G01B 2290/70

USPC .................................................. 356/451–456
See application file for complete search history.

(56) References Cited

U.S. PATENT DOCUMENTS

| | | | | |
|---|---|---|---|---|
| 4,193,693 A | * | 3/1980 | Frosch | G01J 3/4535 356/452 |
| 4,655,587 A | * | 4/1987 | Wijntjes | G01J 3/4535 318/640 |
| 6,006,128 A | * | 12/1999 | Izatt | A61B 5/0066 600/476 |
| 2005/0057756 A1 | * | 3/2005 | Fang-Yen | G01B 9/02072 356/497 |
| 2012/0002210 A1 | * | 1/2012 | Andersen | G01J 3/45 356/450 |

FOREIGN PATENT DOCUMENTS

JP  2009-139352 A  6/2009

* cited by examiner

*Primary Examiner* — Tarifur Chowdhury
*Assistant Examiner* — Jonathon Cook
(74) *Attorney, Agent, or Firm* — Sughrue Mion, PLLC

(57) ABSTRACT

Feedback control of an object which moves back and forth in a straight line along a linear guide is performed through PID control. A parameter adjustment unit which determines the control parameters to be used for PID control performs feedback control and determines the optimal value of control parameters by means of an evaluation function based on the error between the measured value of the current velocity and the target velocity, for the control parameters of maximum reverse voltage and at least one from among proportional coefficient ($C_P$), differential coefficient $C_D$), integral coefficient $C_I$, and frictional coefficient ($C_F$).

8 Claims, 4 Drawing Sheets

OBJECT MOVEMENT CONTROL DEVICE AND FOURIER TRANSFORM INFRARED SPECTROPHOTOMETER

TECHNICAL FIELD

The present invention relates to a movement control device for an object which moves in a straight line along a linear guide, and a Fourier transform infrared spectrophotometer (hereinafter referred to as FTIR) as an example of a device which comprises such a movement control device.

BACKGROUND ART

An FTIR is used for qualitative analysis and quantitative analysis of substances and can be employed for a broad range of substances, whether organic or inorganic. In an FTIR, analysis is performed by moving a movable mirror back and forth and acquiring an interference signal, but since the detector has a frequency characteristic, when collecting data, it is important for the movable mirror to move at a constant velocity. To achieve constant velocity, feedback control is performed, whereby the current velocity is acquired and the error between it and the target velocity is corrected. A laser interferometer is employed for acquisition of the current velocity. When the position of the movable mirror changes, the intensity of the laser interference signal will change, and if the movable mirror is moving at a constant velocity, the laser interference signal will be detected as a sine wave of constant frequency. If this interference signal is treated as a signal having an amplitude in the plus direction and minus direction from ground level (known as a fringe signal), the time during which the movable mirror has moved the distance of the optical path difference corresponding to one wavelength of the laser can be measured by measuring the time of the interval from one rising zero crossing (the time point of rising from ground level) to the next rising zero crossing. Namely, the velocity of the movable mirror can be measured.

The present inventor has proposed an FTIR which comprises a movable mirror control device comprising a control interferometer of a type wherein a movable mirror is suspended such that its initial balance position is in the gravity direction, and which, using measured values of the current position and current velocity of the movable mirror, performs feedback control of the current provided for driving the movable mirror such that the movement velocity of the movable mirror will be at the target velocity, based on values obtained by applying gain to the distance from the balance position of the movable mirror, the current velocity of the movable mirror and the difference between the current velocity and the target velocity of the movable mirror (see Patent Literature 1). Here, taking at least a portion of these gains as variable parameters, adjustment is performed such that the variable parameters will be at an optimal value in order to bring the movement velocity of the movable mirror to the target velocity at the time of adjustment.

As the object, the present invention specifies not this sort of movable mirror but rather an object which moves in a straight line along a linear guide. This object may be the movable mirror itself, or another component. In the case where it is another component, the movable mirror is integrally mounted thereon. In the case of a movable mirror which moves in a straight line along a linear guide, voltage is applied to a coil which drives the movement of the movable mirror, and the movable mirror moves on the linear guide due to electromagnetic force generated by current flowing through the coil and a magnetic field created by a magnet, so the velocity of the movable mirror is controlled by successively changing the voltage applied to the coil which drives the movement of the movable mirror.

PRIOR ART LITERATURES

Patent Literatures (Patent Literature 1) Japanese Unexamined Patent Application Publication 2009-139352

SUMMARY OF THE INVENTION

Problem to be Solved by the Invention

The optimal value of the control parameters such as the proportional coefficient differs depending on the state of the device, due to various causes such as deterioration over time, or in case of poor quality of the linear guide. If the control parameters are not at suitable values, it is conceivable that there may be situations where the device will not perform adequately or errors will occur during measurement. Therefore, to ensure the performance of the device, it is necessary to maintain the control parameters at suitable values, but the determination of control parameters takes up man-hours.

The purpose of the present invention is to make it possible to automatically perform determination of control parameters.

Means for Solving the Problem

In the present invention, feedback control based on proportional-integral-derivative (hereinafter referred to as PID) control is performed in order to control the movement of an object which moves in a straight line along a linear guide. PID control is a feedback control method in which control of input values is performed based on three elements: the error between the output value and the target value, and the integral and derivative thereof. Under PID control, the voltage applied to the driving coil is determined using a PID control formula as follows.

$$Vn = C_P V\mathrm{err} + C_D \Delta_V + C_I \Sigma V\mathrm{err} + C_F \quad (1)$$

Here,
Vn: the voltage to be determined (the voltage to be applied this time);
Verr: velocity error;
$\Delta_V$: difference between previous and current velocity;
$\Sigma$Verr: sum of velocity errors;
$C_P$: proportional coefficient;
$C_D$: differential coefficient;
$C_I$: integral coefficient;
$C_F$: frictional coefficient.

The proportional coefficient $C_P$, differential coefficient $C_D$, integral coefficient $C_I$ and frictional coefficient $C_F$ are referred to as control parameters, $C_P$Verr is referred to as a proportional term, $C_D \Delta_V$ is referred to as a differential term, $C_I \Sigma$Verr is referred to as an integral term and $C_F$ is referred to as a frictional term. The control parameters were determined in the prior art experimentally or empirically, but in the present invention, they are determined automatically.

In the linear guide, a situation occurs whereby some portions of the movable range have good sliding while adjacent portions have poor sliding. This is a point which differs from the suspension type movement mechanism previously proposed by the present inventor in Patent Literature 1. In the linear guide, a high voltage is applied for control in portions with poor sliding, but if a portion with good sliding is entered in that state, the velocity of the movable mirror will suddenly become faster. In such a case, voltage is applied in the direction which reduces velocity (reverse direction), but if the voltage in the direction which reduces velocity becomes too large, the movable mirror will stop, and it will take time until the movable mirror can be again set into motion and the velocity error can be reduced. Thus, it is necessary for the voltage applied in the reverse direction not to be applied beyond a certain extent. On the other hand, a certain level of voltage is necessary because, after the velocity has increased, the portions where the velocity error is large will continue to exist if the voltage applied in the reverse direction is too small. The maximum voltage $V_A$ of the voltage applied in the reverse direction is also an important quantity, and thus, in the present invention, the maximum reverse voltage $V_A$ is treated as a control parameter.

The present invention employs a CPU, which is used for interferometer control, and provides a function of modifying the control parameters and a function of acquiring velocity error in a program executed by that CPU. Using these functions, suitable control parameters are determined such that the velocity error will be small and measurement will not stop.

The object movement control device of the present invention comprises an interferometer of a type wherein a phase plate is arranged between a beam splitter and a stationary mirror or movable mirror, two polarized light components are separated and detected from an interference signal combined by the beam splitter, and the movement direction and position of the movable mirror are detected based on the phase relationship and wavenumber of two detection signals whereof the phases are offset from each other. The movable mirror is driven by electromagnetic force generated by current flowing due to voltage applied to a coil, and is supported so as to move back and forth in a straight line along a linear guide.

A control unit is provided for controlling the voltage applied to the coil for driving the movable mirror. This control unit comprises an interferometer drive unit, control parameter storage unit and parameter adjustment unit.

The interferometer drive unit, using measured values of the current position and current velocity of the movable mirror, performs feedback control on the voltage to be applied for driving the movable mirror such that the movement velocity of the movable mirror attains a set target velocity, by means of a PID scheme over a set operating range of the linear guide, using as control parameters the PID control formula's proportional coefficient $C_P$, derivative coefficient $C_D$, integral coefficient $C_I$, frictional coefficient $C_F$ and maximum reverse voltage $V_A$, which is the maximum value of reverse voltage applied in the direction which reduces the velocity of the movable mirror during feedback control.

The control parameter storage unit stores the control parameters used by the interferometer drive unit.

The parameter adjustment unit performs feedback control and determines the optimal value of control parameters using an evaluation function based on the error between the target value and the measured value of the current velocity, for at least one of the proportional coefficient $C_P$, derivative coefficient $C_D$, integral coefficient $C_I$ and frictional coefficient $C_F$, and for the maximum reverse voltage $V_A$. The determined control parameters are stored in the control parameter storage unit, and if the given control parameter has already been stored, it is updated based on the newly determined control parameter.

Here, the expression that the control unit "controls the voltage to be applied to the coil" is used, but since voltage is applied to the coil in order to cause current to flow, this is the same as "controlling the current flowing to the coil." Therefore, the present invention includes the case where PID control is performed on the current flowing to the coil.

In a preferable embodiment, the interferometer drive unit is able to modify the target velocity. In such a case, when the target velocity has been modified, the parameter adjustment unit determines new optimal values for the control parameters, and updates the control parameters stored in the control parameter storage unit.

In another preferable embodiment, the interferometer drive unit is able to modify the operating range. In such a case, when the operating range has been updated, the parameter adjustment unit determines new optimal values for the control parameters and updates the control parameters stored in the control parameter storage unit.

An example of a device employing this sort of object movement control device is an FTIR. Such an FTIR comprises a movable mirror control device comprising a control interferometer of a type wherein a phase plate is arranged between a beam splitter and a stationary mirror or movable mirror of a main interferometer which performs measurements of samples, two polarized light components are separated and detected from an interference signal combined by the beam splitter, and the movement direction and position of the movable mirror are detected based on the phase relationship and wavenumber of two detection signals whereof the phases are offset from each other, and the object movement control device of the present invention is used as the movable mirror control device.

Effect of the Invention

With the object movement control device of the present invention, the control parameters can be determined automatically, making it possible to reduce the effect on performance of individual differences and degradation over time of the object movement control device and its components. Furthermore, there is no need for a knowledgeable technician to adjust the control parameters, so adjustment can be performed not just during production but at any time, such as upon installation or relocation, thus making it easy to ensure performance of the device and providing for a reduction in adjustment man-hours.

A similar effect can be achieved with an FTIR using this object movement control device as a movable mirror control device.

DETAILED DESCRIPTION OF THE EXEMPLARY EMBODIMENTS

Figure 1:
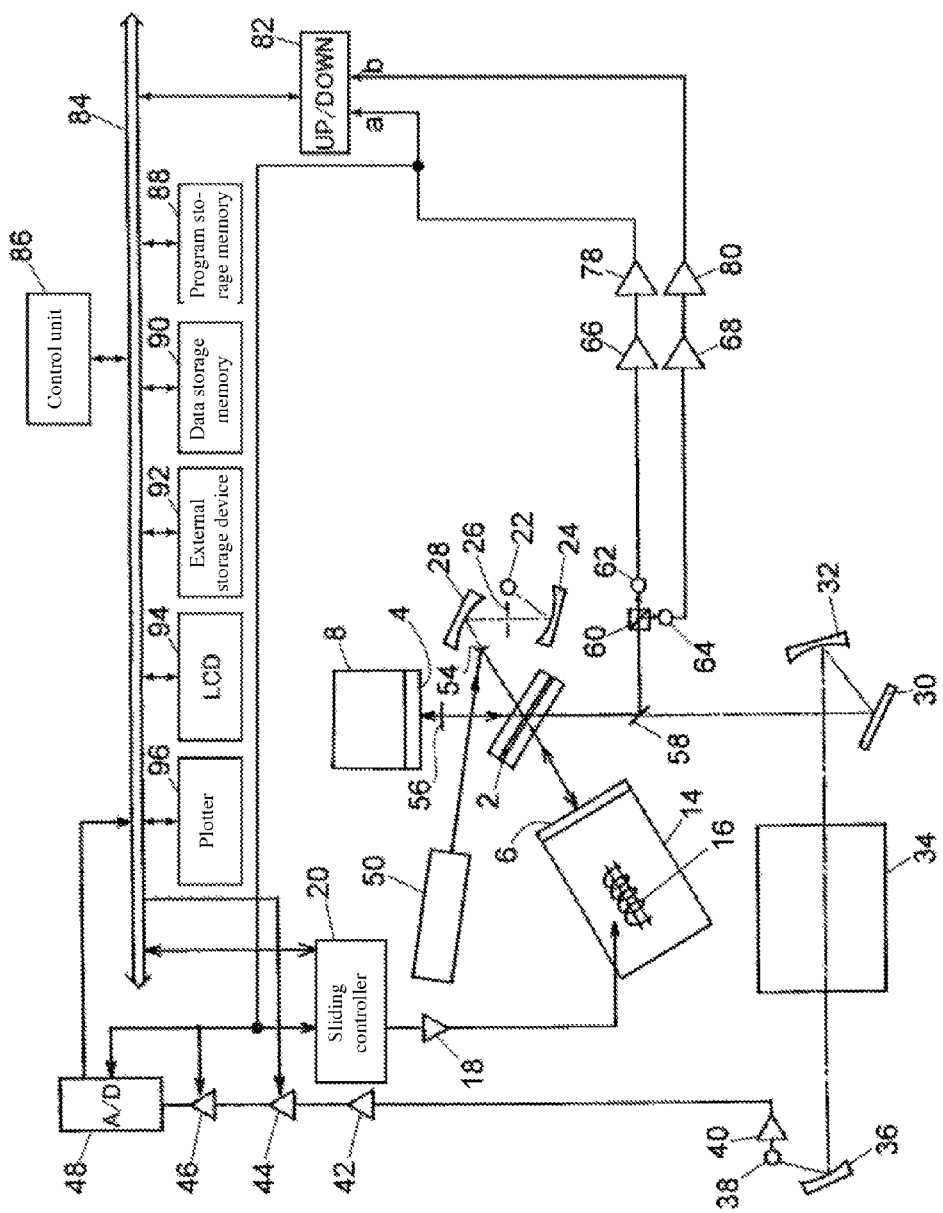
FIG. 1 is a block diagram illustrating the configuration of one example of an FTIR to which the present invention is applied.

FIG. 1 illustrates an example of an FTIR to which the present invention is applied. With regard to beam splitter and compensator (referred to simply as beam splitter) 2, an interferometer is constituted by stationary mirror 4 and movable mirror 6, and the beam splitter 2 is arranged with a tilt of 30 degrees to the normal direction of the stationary mirror 4 and the normal direction of the movable mirror 6. Stationary mirror 4 is mounted on a stationary mirror support block 8, movable mirror 6 is supported on sliding mechanism 14, and sliding mechanism 14 moves the movable mirror 6 back and forth toward and away from the beam splitter 2 by means of a linear motor 16. Current is supplied to the linear motor 16 from a power amplifier 18, and the current supplied to the linear motor 16 is controlled through sliding controller 20 via power amplifier 18.

An infrared light source 22 is provided to constitute a main interferometer along with beam splitter 2, stationary mirror 4 and movable mirror 6 and to form an infrared spectrometric system. Infrared light from light source 22 passes through condensing mirror 24, aperture 26 and collimator mirror 28 and is inputted into beam splitter 2, and is modulated by this interferometer. The modulated light, after passing via mirror 30 and condensing mirror 32 through sample chamber 34, transits via elliptical mirror 36 and is received by infrared detector 38 and converted to an electrical signal. A preamplifier 40 is provided for amplifying the detection signal of detector 38, and the detection signal which has been amplified by preamplifier 40 passes through filter 42 and automatic gain amplifier 44 and is sampled by sample-and-hold amplifier 46 and is converted by AD converter 48 to a digital signal and is transmitted to CPU bus line 84.

An He—Ne laser 50 is provided as a light source in order to form a control interferometer along with beam splitter 2, stationary mirror 4 and movable mirror 6. A laser beam from laser 50 is inputted by means of half-mirror 54 into beam splitter 2. In order for the laser beam which has been reflected by beam splitter 2 and then reflected by stationary mirror 4 and has returned to the beam splitter 2 to be changed from linearly polarized light to circularly polarized light, a (λ/8) plate 56 is provided between beam splitter 2 and stationary mirror 4. The (λ/8) plate 56 is installed such that its axis of polarization is tilted 45 degrees to the plane of polarization of the input laser beam.

A polarized light beam splitter 60 is provided for splitting the interference light modulated by this interferometer and reflected by half-mirror 58, into P-wave and S-wave polarized light components. A photodiode 62 is provided as a detector which receives one of the polarized light components that has passed through the polarized light beam splitter 60, and a photodiode 64 is provided as a detector that receives the other polarized light component reflected by the polarized light beam splitter 60. The signals detected by the photodiodes 62, 64 are fringe signals. Photodiode 62 is connected to preamplifier 66 and photodiode 64 is connected to preamplifier 68. The polarized light component detection signals amplified by pre-amps 66, 68 are changed to pulse series signals a, b by waveform shapers 78, 80. The two waveform-shaped pulse signals a, b are inputted into up/down counter 82. The up/down counter 82 determines the up/down mode based on the phase relationship of the two input signals, counts the number of pulses of the input signals, and outputs it onto CPU bus line 84.

The pulse signal a generated by waveform-shaping of the detection signal of photodiode 62 is further sent to sliding controller 20, sample-and-hold amplifier 46 and AD converter 48. Control unit 86, program storage memory 88, data storage memory 90, external storage device 92, LCD (liquid crystal display) 94, plotter 96, automatic gain amplifier 44, AD converter 48 and up/down counter 82 are connected to CPU bus line 84.

Figure 2:
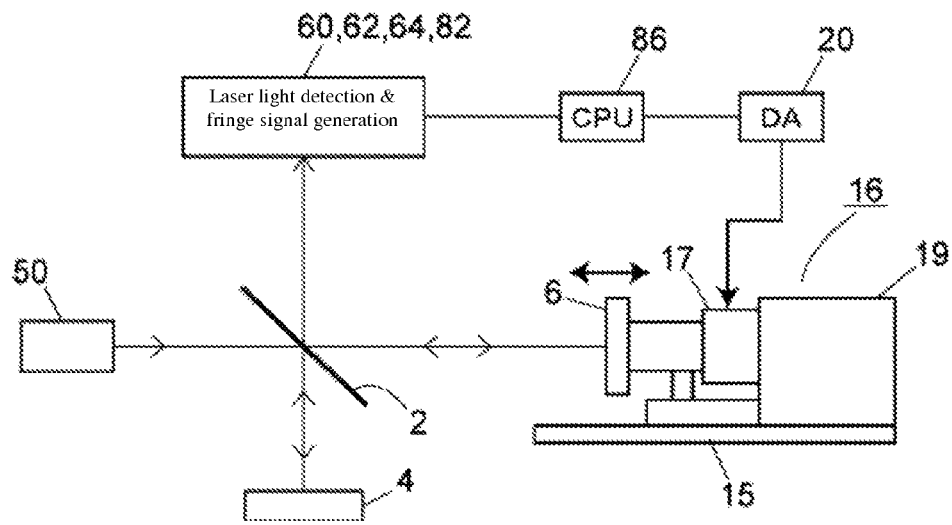
FIG. 2 is a block diagram illustrating the movable mirror control mechanism in said FTIR.

FIG. 2 illustrates the movable mirror control mechanism in the same example of embodiment. Movable mirror 6 is mounted on voice coil 17, and voice coil 17 is combined with a magnet 19. The voice coil 17 is supported so as to move back and forth in a straight line along linear guide 15, allowing the movable mirror 6 to move along the linear guide 15 in conjunction with the movement of the voice coil 17. The movable mirror 6 is driven and moves due to the electromagnetic force generated by current flowing due to the voltage applied to the voice coil 17.

The control system for controlling the movement of the movable mirror 6 is illustrated in detail in FIG. 1, and is thus shown in FIG. 2 in simplified fashion as a block diagram. The beam splitter 2, stationary mirror 4, movable mirror 6 and laser light source 50 which make up the control interferometer, the fringe signal generating units 60, 62, 64, 82, the CPU 86 which is the control unit, and DA converter 20 which is representative of the sliding controller 20, are illustrated in simplified fashion.

Figure 3:
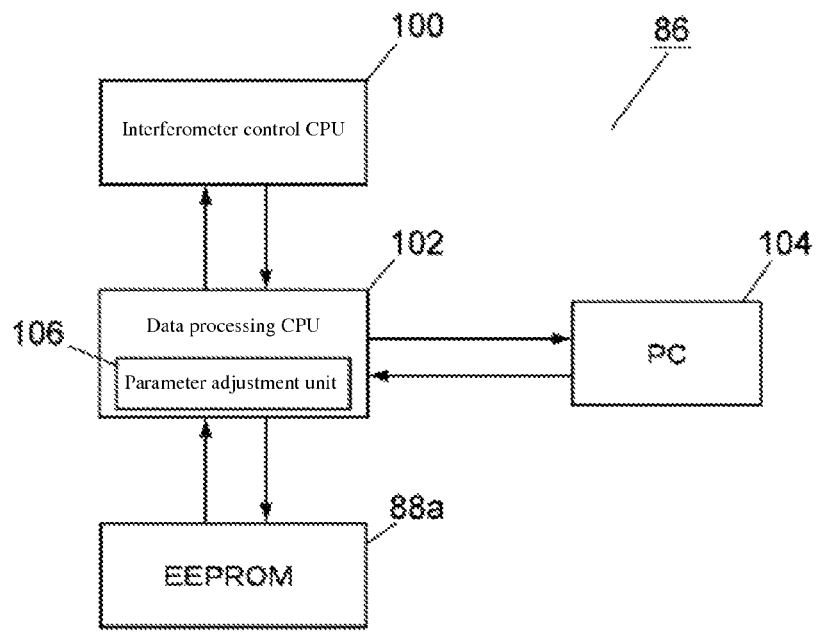
FIG. 3 is a block diagram illustrating the configuration of the control unit in said FTIR.

Control unit 86, as shown in FIG. 3, includes an interferometer control CPU 100, data processing CPU 102, and EEPROM (electrically erasable PROM) 88a which stores control parameters used for calculation of voltage levels for driving the movable mirror 6. An external PC (personal computer) 104 is connected to the control unit 86.

Figure 4:
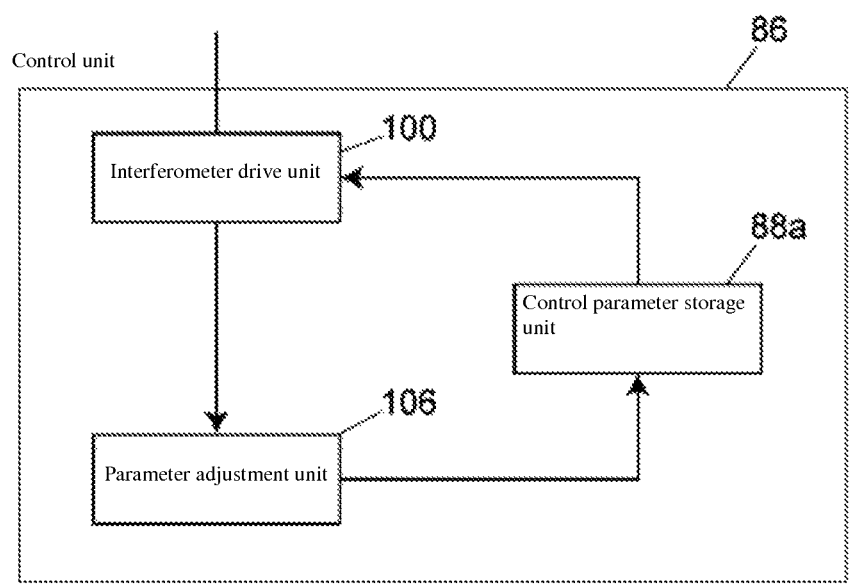
FIG. 4 is a block diagram illustrating the function of said control unit.

The control unit 86 may be functionally represented as shown in FIG. 4. The interferometer drive unit, which corresponds to interferometer drive CPU 100, using measured values of the current position and current velocity of the movable mirror 6, performs feedback control on the voltage to be applied for driving the movable mirror 6 such that the movement velocity of the movable mirror 6 attains a set target velocity, by means of a PID scheme over a set operating range of the linear guide 15, using as control parameters the PID control formula's proportional coefficient $C_P$, derivative coefficient $C_D$, integral coefficient $C_I$, frictional coefficient $C_F$ and maximum reverse voltage $V_A$. The control parameter storage unit is implemented by means of EEPROM 88a and stores the control parameters used by the interferometer drive unit. The parameter adjustment unit 106, implemented by data processing CPU 102, determines the control parameters by performing feedback control and determining the optimal value using an evaluation function based on the error between the measured value of current velocity and the target velocity, for at least one of the proportional coefficient $C_P$, derivative coefficient $C_D$, integral coefficient $C_I$ and frictional coefficient $C_F$, and for the maximum reverse voltage $V_A$. The determined control parameters are stored in the control parameter storage unit, or if the control parameters have already been stored in the control parameter storage unit, the stored control parameters are updated with the newly determined control parameters.

The operation of this FTIR will be described.

(a) Operation of the Control Interferometer:

Laser interference lights of different phases split by the polarized light beam splitter 60 are received by photodiodes 62, 64, the detection signals of the photodiodes 62, 64 are subjected to waveform shaping and made into pulse signals, which are acquired as two input signals a, b of up/down counter 82. In the up/down counter 82, the up/down mode is determined based on the phase relationship of the two input signals. Namely, if the movable mirror 6 is approaching the beam splitter 2, the phase of one of the signals a will be advanced 90 degrees in relation to the other signal b, and conversely, if the movable mirror 6 is moving away from the beam splitter 2, signal a will be delayed 90 degrees in relation to b. Furthermore, the pulse count of input signals counted by the up/down counter 82 constitutes a signal dependent on the position of the movable mirror 6. The output signal of the up/down counter 82 is acquired via bus line 84 by the interferometer control CPU 100 of the control unit 86, and is used as a signal for detecting anomalies of sliding of the movable mirror or for performing interferogram integration for infrared spectrometry.

The sliding controller 20 controls the voltage applied to the linear motor 16 via power amplifier 18 such that the frequency of the detection signal of photodiode 62 will be constant. The shaped detection output (signal a) of photodiode 62 is used both as a sampling signal of sample-and-hold amplifier 46 and as a conversion start signal of A/D converter 48.

(b) Operation of Infrared Data Collection:

The signal which has been outputted from infrared light source 22 and modulated by the interferometer, and which has passed through the sample chamber 34 and has been converted to an electrical signal in infrared detector 38, passes from preamplifier 40 to filter 42 and automatic gain amplifier 44 and is sampled by sample-and-hold amplifier 46 and converted to a digital signal by A/D converter 48, and is acquired on bus line 84. As the movable mirror 6 moves, an interferogram is generated. The A/D conversion of A/D converter 48 is initiated using signal a, which is an interference signal of the control interferometer. The current position of the movable mirror 6 is detected in real time through quadrature control, the corresponding current position signal is generated by up/down counter 82, and to determine the data collection starting point and end point of an interferogram series, this signal is successively recognized by the interferometer control CPU 100 of the control unit 86, and data collection is performed in the direction of reciprocation of movable mirror 6.

Figure 5:
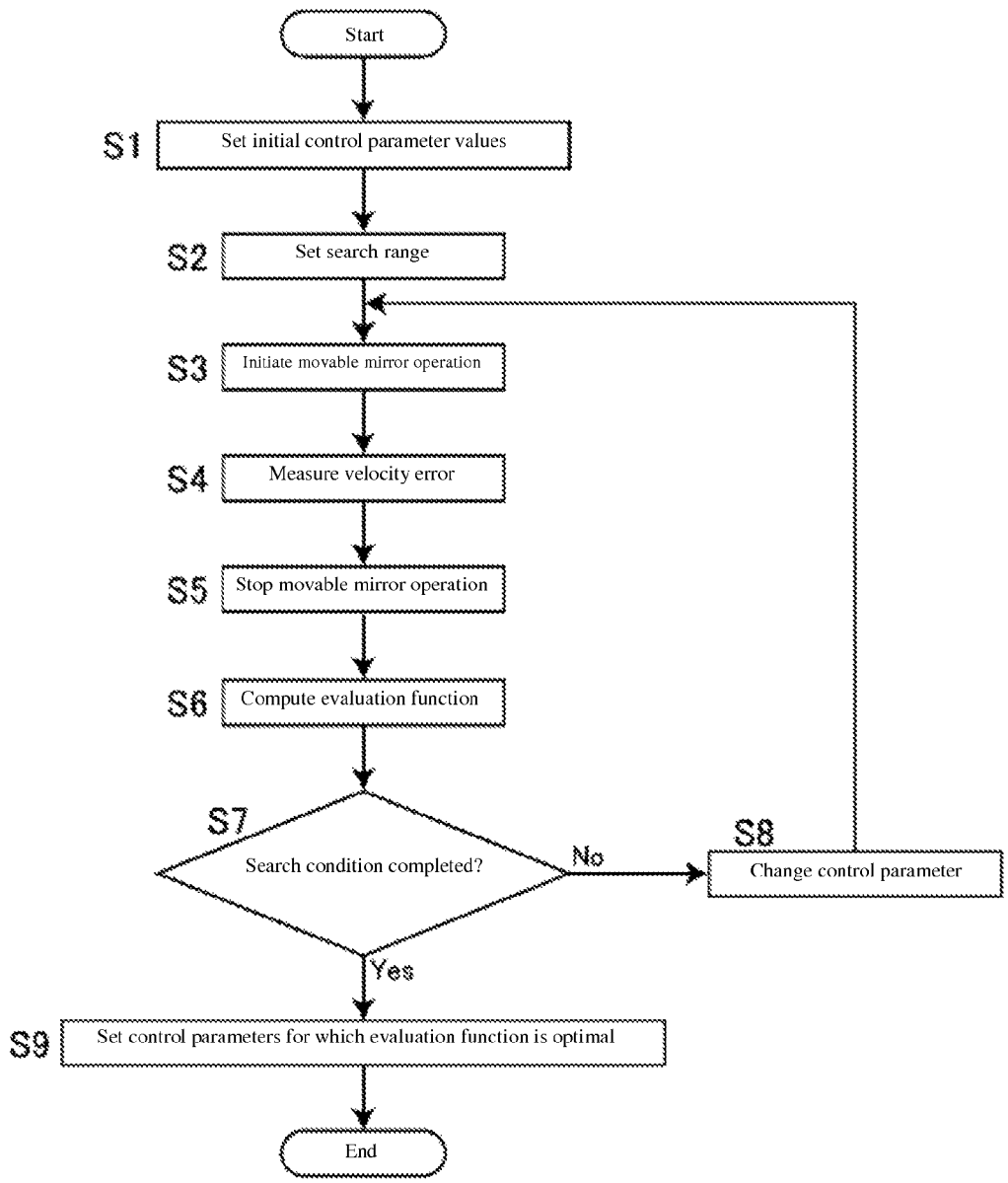
FIG. 5 is a flow chart illustrating the operation of an example of embodiment.

The operation of an example of embodiment is illustrated by means of a flow chart in FIG. 5.

(1) Set initial values of control parameters (step S1). There are five control parameters: proportional coefficient $C_P$, derivative coefficient $C_D$, integral coefficient $C_I$, frictional coefficient $C_F$ and maximum reverse voltage $V_A$. Initial values are set for each of these five control parameters. Values determined experimentally using several devices can be used for the initial values of the control parameters. Starting from these initial values can provide for a shortening of adjustment time.

(2) Set the search range over which the control parameters are to be varied (step S2). Several methods of setting the search range may be considered. Examples of two setting methods will be given.

a) Method of searching within a set range from the initial value. If this method is employed, the optimum may not be found, but the adjustment time can be shortened. In this case, there is the method of searching all of the five control parameters within a set range, and the method of limiting the number of control parameters to be searched and searching within a set range only for selected control parameters. In the latter case, the search is limited to the maximum reverse voltage $V_A$ and between one and three parameters from among the proportional coefficient $C_P$, derivative coefficient $C_D$, integral coefficient $C_I$ and frictional coefficient $C_F$. To make this simpler, the search may be limited to the maximum reverse voltage $V_A$ and one parameter from among the proportional coefficient $C_P$, derivative coefficient $C_D$, integral coefficient $C_I$ and frictional coefficient $C_F$.

b) Method of searching a wide range. This method involves a long adjustment time, but increases the likelihood of finding the optimum. With regard to the control parameters to be searched, what was stated under a) above applies to this method as well.

(3) Initiate Operation of the Movable Mirror (Step S3).

(4) Measure velocity error (step S4). Velocity error can be measured for each fringe, so the velocity error Verr for each fringe is stored. Here, the movable mirror may not be correctly controlled and may stop depending on the value set for the search with regard to the control parameter to be searched. If the mirror stops, it is deemed that acquisition of velocity error was not completed within the stipulated time and the value of the set control parameter is excluded from evaluation.

(5) Once movement of the movable mirror across a predetermined range has been completed (step S5), the evaluation function is computed (step S6). An example of the evaluation function f ($C_P$, $C_D$, $C_I$, $C_F$, $V_A$) is presented next.

$$f(C_P, C_D, C_I, C_F, V_A) = \alpha |Verr|\text{ave} + \beta |Verr|\text{max}$$

Here, $\alpha$ and $\beta$ are weighting coefficients, |Verr|ave is the average of the absolute values of velocity errors Verr, and |Verr|max is the maximum of the absolute values of velocity errors Verr.

Furthermore, since situations where the velocity error changes rapidly should be avoided, if there are locations where velocity error exceeds a stipulated value, an evaluation function value is given by increasing the value of the evaluation function or the like.

The above evaluation function is an example, and other evaluation functions can also be used. For instance, one can use the average value of the square of absolute values of velocity error Verr instead of the average value of the absolute values of velocity error, and use the difference between the maximum and minimum values of the absolute value of velocity error Verr instead of the maximum value of the absolute value of velocity error.

(6) If the search of the search range has been completed for the control parameters to be searched (step S7), the optimal control parameters are extracted based on evaluation function values calculated to that point and are taken as the new control parameters (step S8). When an evaluation function as described above is selected, control parameters which minimize its value should be selected as the optimal values.

(7) If the search has not been completed (step S9), a new control parameter to be searched is set, and steps 3 through 6 are repeated. The following methods can be considered as the method of setting new parameters.

(a) Increase/decrease the control parameter over an arbitrary range.

(b) Determine the direction of increase/decrease and the value of increase/decrease of the control parameter based on the evaluation function computation results so far. In this case, the search count and convergence condition can be specified as the search completion conditions. An example of a convergence condition would be if the values of the evaluation function when the control parameter is increased/decreased fall within a predetermined range.

The flow of the present invention is as described above. The determined control parameters are stored in control parameter storage unit 88a, which consists of EEPROM inside the FTIR. The control parameter storage unit may also be provided in an external computer, such as a personal computer (PC), connected to the FTIR.

Since the control parameters change based on the operating velocity of the movable mirror, in cases where the FTIR allows varying the operating velocity of the movable mirror, when the operating velocity has been changed, a search is executed for that operating velocity, the optimal control parameters are determined, and the control parameters stored in the control parameter storage unit 88a are updated.

There are cases where the optimal value of control parameters will also change depending on the operating range of the movable mirror. For example, in cases where the machining precision of the linear guide is poorer near the ends, the suitable control parameters may differ when operating only near the middle versus when operating up to the ends. Therefore, in cases where the FTIR allows the operating range of the movable mirror to be changed, if the operating range has been changed, a search is executed for that operating range, the optimal control parameters are determined, and the control parameters stored in the control parameter storage unit 88a are updated.

In the example of embodiment, a case was described where the object was the movable mirror of the FTIR itself; however, the present invention can also be applied in cases where the object is not the movable mirror itself but rather another component. In such cases, the movable mirror is integrally mounted on that component. Thus, the present invention can be applied in a wide range of fields where it is necessary to control an object such that it moves in a straight line along a linear guide at a constant velocity.

EXPLANATION OF THE REFERENCES

2 Beam splitter
4 Stationary mirror
6 Movable mirror
15 Linear guide
16 Linear motor
86 Control unit
88a Control parameter storage unit
100 Interferometer control unit
106 Parameter adjustment unit

What is claimed:
1. An object movement control device, comprising:
an interferometer including a phase plate arranged between a beam splitter and a stationary mirror or movable mirror,
two polarized light components separated and detected from an interference signal combined by said beam splitter,
wherein a movement direction and a position of the movable mirror are detected based on a phase relationship and a wavenumber of two detection signals whereof the phases are offset from each other,
wherein said movable mirror is driven by electromagnetic force generated by current flowing due to voltage applied to a coil, and is supported so as to move back and forth in a straight line along a linear guide; and
a control unit that controls the voltage applied to said coil in order to drive said movable mirror, the control unit comprising:
an interferometer drive processor that performs feedback control on the voltage to be applied for driving the movable mirror by using measured values of the current position and current velocity of the movable mirror and a PID control formula over a set operating range of said linear guide such that the movement velocity of said movable mirror attains a set target velocity, wherein said PID control formula comprises control parameters comprising proportional coefficient $C_P$, derivative coefficient $C_D$, integral coefficient $C_I$, frictional coefficient $C_F$, and maximum reverse voltage, which is a maximum value of reverse voltage applied in a direction that reduces the velocity of said movable mirror during feedback control;
a control parameter storage that stores the control parameters used by said interferometer drive processor; and
a processor comprising a parameter adjustment unit that performs feedback control and determines optimal values for at least one of said control parameters using an evaluation function based on the error between the target velocity and the measured value of the current velocity.

2. The object movement control device as described in claim 1, wherein said interferometer drive processor is able to modify said target velocity, and said parameter adjustment unit, when the target velocity has been modified, determines new optimal values of the control parameters and updates the control parameters stored in said control parameter storage.

3. The object movement control device as described in claim 1, wherein said interferometer drive processor is able to modify said operating range, and said parameter adjustment unit, when the operating range has been modified, determines new optimal values of the control parameters and updates the control parameters stored in said control parameter storage.

4. The object movement control device as described in claim 2, wherein said interferometer drive processor is able to modify said operating range, and said parameter adjustment unit, when the operating range has been modified, determines new optimal values of the control parameters and updates the control parameters stored in said control parameter storage.

5. A Fourier transform infrared spectrophotometer, comprising:
the object movement control device as described in claim 1.

6. A Fourier transform infrared spectrophotometer, comprising:
the object movement control device as described in claim 2.

7. A Fourier transform infrared spectrophotometer, comprising:
the object movement control device as described in claim 3.

8. A Fourier transform infrared spectrophotometer, comprising:
the object movement control device as described in claim 4.

* * * * *